US012646845B2

(12) United States Patent
Kusunose

(10) Patent No.: US 12,646,845 B2
(45) Date of Patent: Jun. 2, 2026

(54) ANTENNA DEVICE, ANTENNA MODULE, AND RADIO DEVICE

(71) Applicant: Sony Group Corporation, Tokyo (JP)

(72) Inventor: Kyosuke Kusunose, Tokyo (JP)

(73) Assignee: Sony Group Corporation, Tokyo (JP)

( * ) Notice: Subject to any disclaimer, the term of this patent is extended or adjusted under 35 U.S.C. 154(b) by 29 days.

(21) Appl. No.: 18/726,128

(22) PCT Filed: Dec. 19, 2022

(86) PCT No.: PCT/JP2022/046578
§ 371 (c)(1),
(2) Date: Jul. 2, 2024

(87) PCT Pub. No.: WO2023/136046
PCT Pub. Date: Jul. 20, 2023

(65) Prior Publication Data
US 2025/0062531 A1 Feb. 20, 2025

(30) Foreign Application Priority Data
Jan. 12, 2022 (JP) ................................ 2022-002884

(51) Int. Cl.
*H01Q 9/04* (2006.01)
*H01Q 1/24* (2006.01)
(Continued)

(52) U.S. Cl.
CPC ........... *H01Q 9/0421* (2013.01); *H01Q 1/243* (2013.01); *H01Q 5/371* (2015.01); *H01Q 9/0414* (2013.01); *H01Q 21/30* (2013.01); *H01Q 5/25* (2015.01)

(58) Field of Classification Search
CPC .. H01Q 9/0421; H01Q 9/0414; H01Q 21/065; H01Q 21/30; H01Q 5/30-371; H01Q 1/243
See application file for complete search history.

(56) References Cited

U.S. PATENT DOCUMENTS 5,148,181 A * 9/1992 Yokoyama .......... H01Q 9/0421 343/702
5,986,606 A * 11/1999 Kossiavas ........... H01Q 9/0421 343/846
(Continued)

FOREIGN PATENT DOCUMENTS

CN 116960627 A * 10/2023 ............. H01Q 9/045
GB 2332780 A * 6/1999 .......... H01Q 9/0421
(Continued)

OTHER PUBLICATIONS

International Search Report and Written Opinion mailed on Mar. 7, 2023, received for PCT Application No. PCT/JP2022/046578, filed on Dec. 19, 2022, 11 pages including English Translation.

*Primary Examiner* — Ab Salam Alkassim, Jr.
(74) *Attorney, Agent, or Firm* — XSENSUS LLP

(57) ABSTRACT

An antenna device includes a first patch antenna, a second patch antenna, and a short circuit plate. The second patch antenna has a resonance frequency different from that of the first patch antenna. The short circuit plate short-circuits one side of the first patch antenna and one side of the second patch antenna to the ground. The length of one side of the short circuit plate, the one side being connected to the one side of the first patch antenna and the one side of the second patch antenna, is shorter than the length of each of the one side of the first patch antenna and the one side of the second patch antenna.

20 Claims, 9 Drawing Sheets

(51) Int. Cl.
*H01Q 5/371* (2015.01)
*H01Q 21/30* (2006.01)
*H01Q 5/25* (2015.01)

(56) References Cited

U.S. PATENT DOCUMENTS

| | | | | | |
|---|---|---|---|---|---|
| 6,160,513 | A * | 12/2000 | Davidson | H01Q 9/0421 | 343/770 |
| 6,343,208 | B1 * | 1/2002 | Ying | H01Q 1/36 | 343/702 |
| 6,408,190 | B1 * | 6/2002 | Ying | H01Q 1/243 | 343/702 |
| 6,476,769 | B1 * | 11/2002 | Lehtola | H01Q 5/371 | 343/702 |
| 6,545,640 | B1 * | 4/2003 | Herve | H01Q 5/357 | 343/846 |
| 7,161,540 | B1 * | 1/2007 | Liu | H01Q 21/30 | 343/846 |
| 2001/0045908 | A1 * | 11/2001 | Keilen | H01Q 5/371 | 343/702 |
| 2002/0003499 | A1 * | 1/2002 | Kouam | H01Q 9/0421 | 343/846 |
| 2002/0130816 | A1 * | 9/2002 | Boyle | H01Q 9/0442 | 343/702 |
| 2004/0155823 | A1 * | 8/2004 | Kossiavas | H01Q 1/243 | 343/702 |
| 2004/0183735 | A1 * | 9/2004 | Jecko | H01Q 5/357 | 343/700 MS |
| 2005/0253758 | A1 * | 11/2005 | Il | H01Q 1/243 | 343/702 |
| 2006/0012524 | A1 * | 1/2006 | Mierke | H01Q 9/0471 | 343/700 MS |
| 2016/0380340 | A1 * | 12/2016 | Inoue | H01Q 1/48 | 343/702 |
| 2018/0123245 | A1 * | 5/2018 | Papió Toda | H01Q 19/005 | |
| 2019/0089053 | A1 * | 3/2019 | Yong | H01Q 1/243 | |
| 2019/0190136 | A1 * | 6/2019 | Sone | H01Q 9/04 | |
| 2019/0273323 | A1 * | 9/2019 | Kyllonen | H01Q 9/0471 | |
| 2021/0286038 | A1 * | 9/2021 | Ren | G01S 13/878 | |
| 2024/0297439 | A1 * | 9/2024 | Glybovski | H01Q 9/0421 | |
| 2024/0304999 | A1 * | 9/2024 | Zhu | H01Q 9/0457 | |
| 2025/0364721 | A1 * | 11/2025 | Fumeaux | H01Q 9/42 | |

FOREIGN PATENT DOCUMENTS

| | | | | |
|---|---|---|---|---|
| JP | S63-046806 | A | | 2/1988 |
| JP | S6346806 | A | * | 2/1988 |
| JP | H03-228407 | A | | 10/1991 |
| JP | H06-314924 | A | | 11/1994 |
| JP | H10-098331 | A | | 4/1998 |
| JP | H1098331 | A | * | 4/1998 |
| JP | 2019-532285 | A | | 11/2019 |
| JP | 2021097328 | A | * | 6/2021 |

* cited by examiner

ANTENNA DEVICE, ANTENNA MODULE, AND RADIO DEVICE

CROSS-REFERENCE TO RELATED APPLICATIONS

The present application is based on PCT filing PCT/JP2022/046578, filed Dec. 19, 2022, which claims priority from Japanese Patent Application No. 2022-002884, filed Jan. 12, 2022, the entire contents of each are incorporated herein by reference.

FIELD

The present disclosure relates to an antenna device, an antenna module, and a radio device.

BACKGROUND

These days, communication devices equipped with UWB (ultra wide band) radio systems are becoming widespread. The UWB radio system is mainly used for short-distance high-speed communication and position detection.

A patch antenna is known as an antenna adapted to a wide communication band like in a UWB radio system. For example, there is known a patch antenna in which multi-resonance is achieved by a scheme in which high-frequency signals of different operating bands are supplied to a planar antenna element in which patch elements having the operating bands are integrated (see Patent Literature 1).

CITATION LIST

Patent Literature

Patent Literature 1: JP 2021-97328 A

SUMMARY

Technical Problem

However, in the above-described technology, since patch elements having different operating frequency bands are integrated in order to achieve multi-resonance, the antenna itself may be increased in size. In the case where a UWB radio system is mounted on a terminal device such as a smartphone, not only bandwidth increase but also downsizing is required of the corresponding antenna.

Thus, the present disclosure provides an antenna device, an antenna module, and a radio device that can be further downsized.

The above problem or object is merely one of a plurality of problems or objects that can be solved or achieved by the plurality of embodiments disclosed in the present specification.

Solution to Problem

An antenna device of the present disclosure includes a first patch antenna, a second patch antenna, and a short circuit plate. The second patch antenna has a resonance frequency different from that of the first patch antenna. The short circuit plate short-circuits one side of the first patch antenna and one side of the second patch antenna to the ground. The length of one side of the short circuit plate, the one side being connected to the one side of the first patch antenna and the one side of the second patch antenna, is shorter than the length of each of the one side of the first patch antenna and the one side of the second patch antenna.

DESCRIPTION OF EMBODIMENTS

Figure 1:
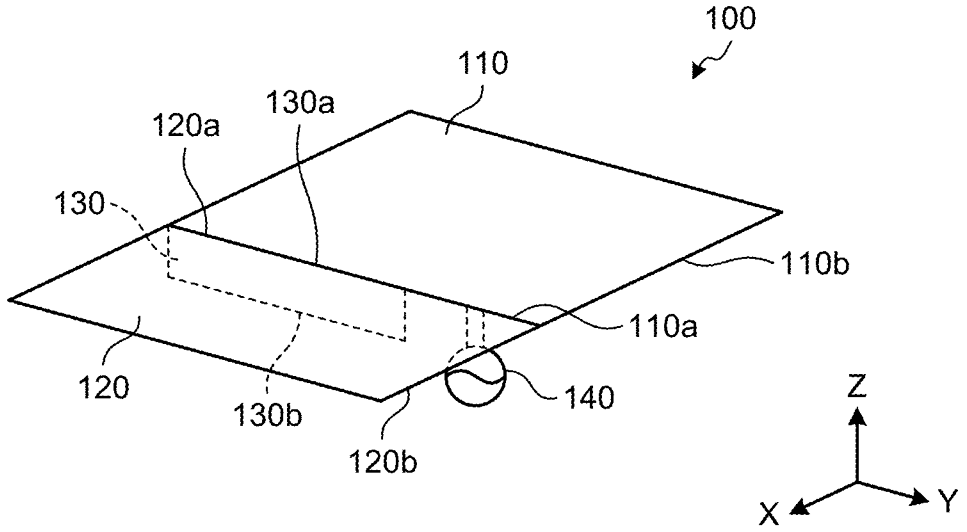
FIG. 1 is a diagram illustrating an example of a schematic configuration of an antenna device according to a first embodiment of the present disclosure.

Hereinbelow, embodiments of the present disclosure are described in detail with reference to the appended drawings. In the present specification and the drawings, substantially the same elements are denoted by the same reference numerals, and a repeated description is omitted.

Further, in the present specification and the drawings, specific values may be indicated and described, but the values are merely examples, and other values may be used.

One or a plurality of embodiments (including implementation examples and modification examples) described below can each be independently implemented. On the other hand, at least part of each of the plurality of embodiments described below may be implemented in combination with at least part of another embodiment, as appropriate. The plurality of embodiments can include novel features different from each other. Therefore, the plurality of embodiments can contribute to the solution of objects or problems different from each other, and can exhibit effects different from each other.

1. First Embodiment

FIG. 1 is a diagram illustrating an example of a schematic configuration of an antenna device 100 according to a first embodiment of the present disclosure. Hereinafter, XYZ coordinates are illustrated in the drawings. The X-axis direction and the Y-axis direction correspond to planar directions of the antenna device 100. The Z-axis direction corresponds to the thickness direction of the antenna device 100.

The antenna device 100 illustrated in FIG. 1 includes a first patch antenna 110, a second patch antenna 120, a short circuit plate 130, and a feeding point 140.

The first patch antenna 110 is formed of, for example, a substantially quadrangular conductor plate. The first patch antenna 110 is, for example, an antenna element that resonates (operates) at a first resonance frequency. The first patch antenna 110 has a first side 110*a* and a second side 110*b* substantially orthogonal to the first side 110*a*. The second side 110*b* has, for example, a length according to the first resonance frequency.

The second patch antenna 120 is formed of, for example, a substantially quadrangular conductor plate. The second patch antenna 120 is, for example, an antenna element that resonates (operates) at a second resonance frequency different from the first resonance frequency. The second patch antenna 120 has a first side 120*a* and a second side 120*b* substantially orthogonal to the first side 120*a*. The second side 120*b* has, for example, a length according to the second resonance frequency.

As illustrated in FIG. 1, the first patch antenna 110 is, at the first side 110*a*, in contact with the first side 120*a* of the second patch antenna 120. The first side 110*a* of the first patch antenna 110 and the first side 120*a* of the second patch antenna 120 have the same length.

The second side 110*b* of the first patch antenna 110 and the second side 120*b* of the second patch antenna 120 have different lengths. Thereby, the first patch antenna 110 and the second patch antenna 120 resonate at different resonance frequencies.

A first side 130*a* of the short circuit plate 130 is in contact with the first side 110*a* of the first patch antenna 110 and the first side 120*a* of the second patch antenna 120. A second side 130*b* facing the first side 130*a* of the short circuit plate 130 is connected (short-circuited) to the ground (illustration omitted).

The short circuit plate 130 short-circuits the first side 110*a* of the first patch antenna 110, and short-circuits the first side 120*a* of the second patch antenna 120. That is, in the antenna device 100, the first patch antenna 110 and the second patch antenna 120 share the short circuit plate 130.

Thereby, as compared to the case where the short circuit plate 130 is provided for each of the first patch antenna 110 and the second patch antenna 120, the number of components of the antenna device 100 can be reduced, and the antenna device 100 can be downsized.

Here, the length of the first side 130*a* of the short circuit plate 130 is shorter than the length of each of the first side 110*a* of the first patch antenna 110 and the first side 120*a* of the second patch antenna 120. Thereby, the antenna device 100 according to the first embodiment of the present disclosure can downsize the first patch antenna 110 and the second patch antenna 120. This point will now be described using FIGS. 2 and 3.

Figure 2:
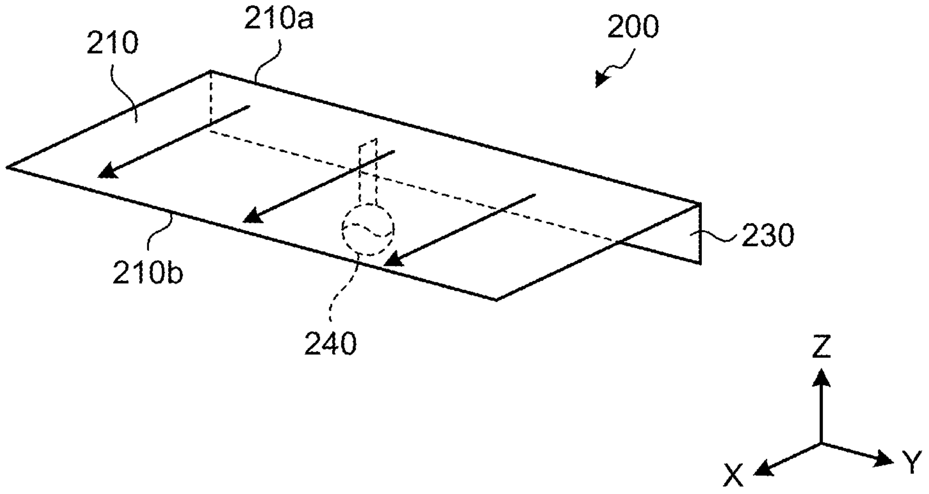
FIG. 2 is a diagram illustrating an example of a schematic configuration of an antenna device.

FIG. 2 is a diagram illustrating an example of a schematic configuration of an antenna device 200. The antenna device 200 of FIG. 2 includes a patch antenna 210, a short circuit plate 230, and a feeding point 240.

The patch antenna 210 has a first side 210*a* and a second side 210*b*, and is in contact with the short circuit plate 230 at the first side 210*a*. One side of the short circuit plate 230 is in contact with the first side 210*a* of the patch antenna 210, and another side is connected to the ground (illustration omitted). The feeding point 240 is connected to a flat surface of the patch antenna 210, and supplies power to the patch antenna 210. By power being supplied by the feeding point 240, a current flows mainly in the X-axis direction of the patch antenna 210, and radio waves are radiated from the patch antenna 210.

As illustrated in FIG. 2, in the antenna device 200, one end (the first side 210*a*) of the patch antenna 210 is short-circuited to the ground (illustration omitted) via the short circuit plate 230. Thereby, the size of the patch antenna 210 (the length of the second side 210*b*) can be reduced to substantially half the size in the case where the short circuit plate 230 is not provided.

In general, the size of the patch antenna 210 not provided with the short circuit plate 230 is about half the wavelength of the resonance frequency ($\frac{1}{2}\lambda$). On the other hand, in the antenna device 200 of FIG. 2, by short-circuiting one end (the first side 210*a*) of the patch antenna 210 by means of the short circuit plate 230, the size of the patch antenna 210 can be reduced to about ¼ of the wavelength of the resonance frequency ($\frac{1}{4}\lambda$).

Figure 3:
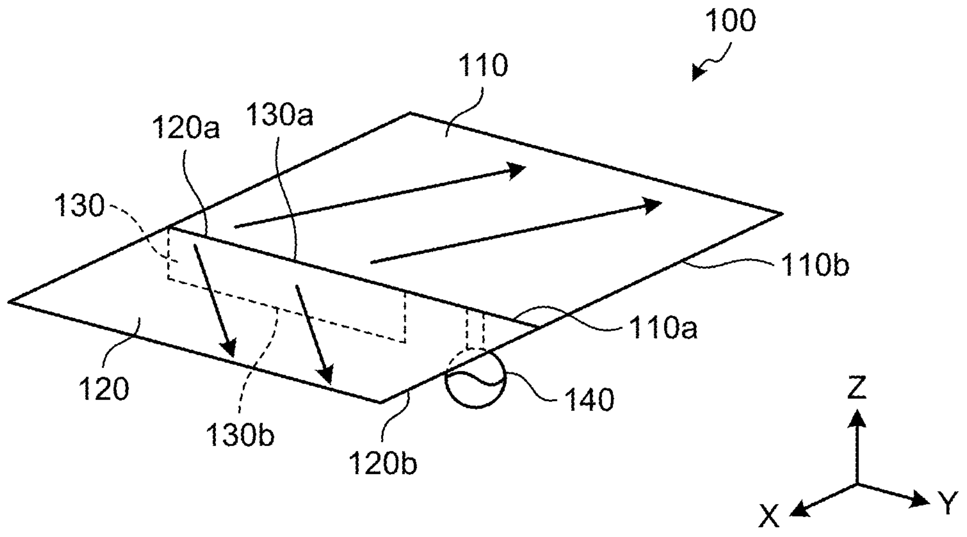
FIG. 3 is a diagram for describing an operation example of the antenna device according to the first embodiment of the present disclosure.

FIG. 3 is a diagram for describing an operation example of the antenna device 100 according to the first embodiment of the present disclosure. As described above, in the antenna device 100 according to the first embodiment of the present disclosure, the length of the short circuit plate 130 is shorter than the length of each of the first and second patch antennas 110 and 120.

Therefore, when power is supplied to the first and second patch antennas 110 and 120, currents each having a wavelength of about ¼ of the wavelength of the respective resonance frequency flow through the first and second patch antennas 110 and 120 obliquely with respect to the X-axis direction.

That is, in the first patch antenna 110 according to the first embodiment of the present disclosure, a current flows from the short circuit plate 130 toward the second side 110*b*, that is, obliquely with respect to the second side 110*b*. Therefore, the length of the second side 110*b* is shorter than about ¼ of the wavelength of the first resonance frequency.

Further, in the second patch antenna 120, a current flows from the short circuit plate 130 toward the second side 120*b*, that is, obliquely with respect to the second side 120*b*. Therefore, the length of the second side 120*b* is shorter than about ¼ of the wavelength of the second resonance frequency.

Thus, by setting the length of the first side 130*a* of the short circuit plate 130 to a length shorter than the length of each of the first sides 110*a* and 120*a* of the first and second patch antennas 110 and 120, the sizes (the lengths of the second sides 110*b* and 120*b*) of the first and second patch antennas 110 and 120 can be reduced.

Returning to FIG. 1, the feeding point 140 is placed to be connected to the first side 110*a* of the first patch antenna 110 and the first side 120*a* of the second patch antenna 120. That is, in the antenna device 100, power is supplied to the first side 110*a* of the first patch antenna 110 and the first side 120*a* of the second patch antenna 120 via the feeding point 140.

Thus, in the antenna device 100 according to the first embodiment of the present disclosure, power is supplied to each of the first and second patch antennas 110 and 120 by one feeding point 140. Thereby, the matching loss in the feeding line can be reduced. Details of this point will be described in a first modification example.

As above, the antenna device 100 according to the first embodiment of the present disclosure includes the first patch antenna 110, the second patch antenna 120 having a resonance frequency different from that of the first patch antenna 110, and the short circuit plate 130.

The short circuit plate 130 short-circuits the first side 110*a* of the first patch antenna 110 and the first side 120*a* of the second patch antenna 120 to the ground (a base plate). The length of one side (the first side 130*a*) of the short circuit plate 130, the one side of the short circuit plate 130 being connected to the first sides 110*a* and 120*a* of the first and second patch antennas 110 and 120, is shorter than the length of each of the first sides 110*a* and 120*a* of the first and second patch antennas 110 and 120.

Thereby, the antenna device 100 can reduce the sizes of the first and second patch antennas 110 and 120, and the antenna device 100 can be downsized.

2. First Modification Example

Figure 4:
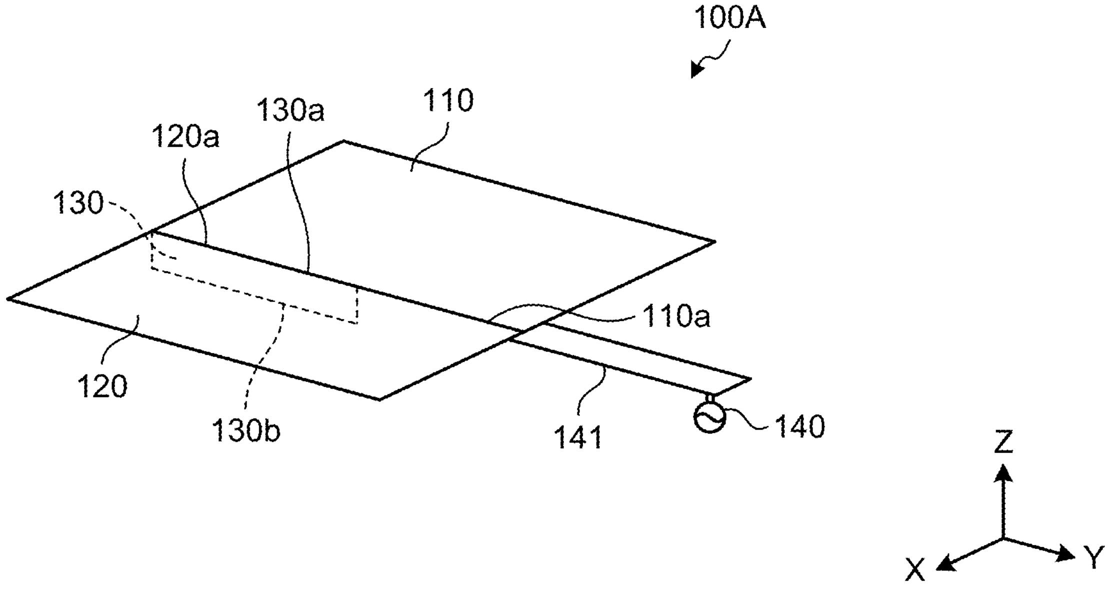
FIG. 4 is a diagram illustrating an example of a schematic configuration of an antenna device according to a first modification example of the first embodiment of the present disclosure.

FIG. 4 is a diagram illustrating an example of a schematic configuration of an antenna device 100A according to a first modification example of the first embodiment of the present disclosure. The antenna device 100A illustrated in FIG. 4 is different from the antenna device 100 illustrated in FIG. 1 in that power is supplied to the first and second patch antennas 110 and 120 via a microstripline 141.

As illustrated in FIG. 4, the antenna device 100A includes a microstripline 141 of which one end is connected to one ends of one sides 110*a* and 120*a* of the first and second patch antennas 110 and 120. More specifically, one end of the microstripline 141 is connected to a corner formed by the first side 110*a* and the second side 110*b* of the first patch antenna 110 and a corner formed by the first side 120*a* and the second side 120*b* of the second patch antenna 120. Another end of the microstripline 141 is connected to the feeding point 140.

Thus, the antenna device 100A can be supplied with power by using the microstripline 141.

Here, as described above, in the antenna device 100A according to the present modification example, power is supplied to each of the first and second patch antennas 110 and 120 by using one feeding point 140. Therefore, power can be supplied to the first and second patch antennas 110 and 120 by one microstripline 141.

Therefore, the antenna device 100A according to the present modification example does not need to, for example, branch the feeding line into two like the antenna element disclosed in Patent Literature 1 described above, and can reduce the matching loss due to branching of the feeding line. This point will now be described using FIGS. 5 to 7.

Figure 5:
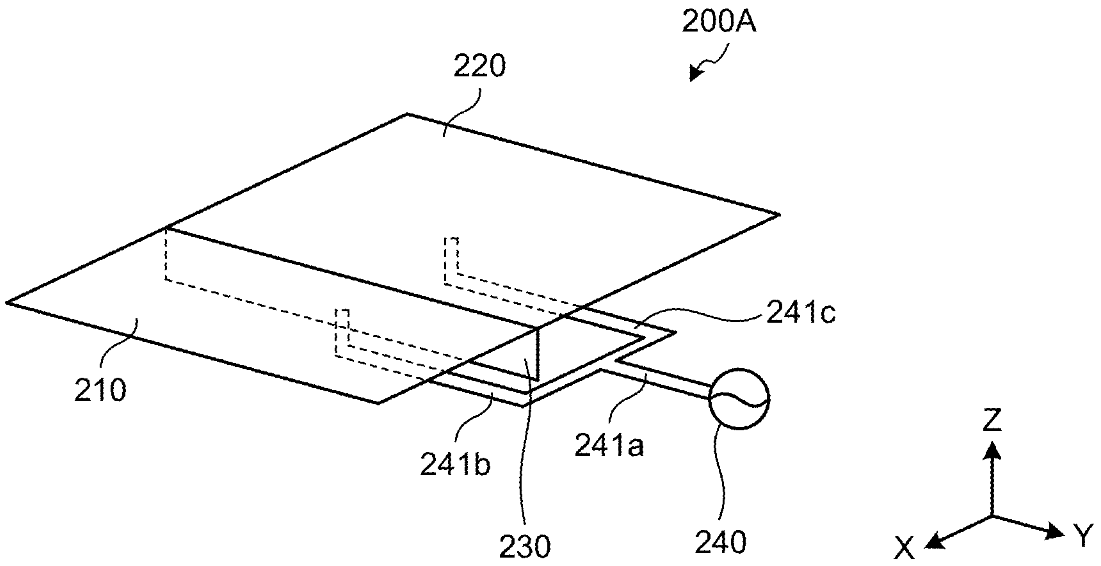
FIG. 5 is a diagram illustrating an example of a schematic configuration of an antenna device.

FIG. 5 is a diagram illustrating an example of a schematic configuration of an antenna device 200A. The antenna device 200A of FIG. 5 includes a first patch antenna 210, a second patch antenna 220, a short circuit plate 230, a feeding point 240, and striplines 241*a* to 241*c*.

In the antenna device 200A, the length of a first side 130*a* of the short circuit plate 230 is the same as the length of each of a first side 210*a* of the first patch antenna 210 and a first side 220*a* of the second patch antenna 220. In this respect, the antenna device 200A is different from the antenna device 100A illustrated in FIG. 4.

Thus, in the antenna device 200A, the first patch antenna 210 and the second patch antenna 220 are divided by the short circuit plate 230. Hence, in the antenna device 200A, the striplines 241*a* to 241*c* are provided as feeders that connect each of the first patch antenna 210 and the second patch antenna 220 and the feeding point 240.

Figure 6:
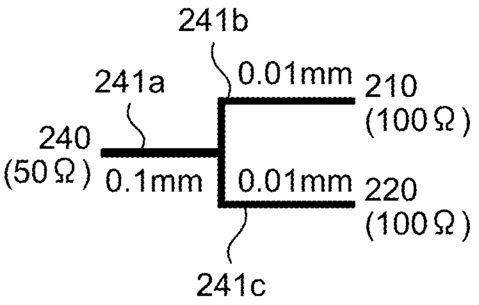
FIG. 6 is a diagram illustrating an example of power supply by striplines.

FIG. 6 is a diagram illustrating an example of power supply by the striplines 241*a* to 241*c*. As illustrated in FIG. 6, in the antenna device 200A, the stripline 241*a* branches into the striplines 241*b* and 241*c*, and thereby supplies power to each of the first patch antenna 210 and the second patch antenna 220.

Here, assuming that the impedance of the stripline 241*a* is 50Ω, it is desirable that the impedance of each of the striplines 241*b* and 241*c* be set to 100Ω in order to match the stripline 241*a*. This is because branched lines (the striplines 241*b* and 241*c*) can be regarded as being connected in parallel.

However, it is difficult to form striplines such that the stripline 241*a* and the striplines 241*b* and 241*c* match. In particular, in the case where the antenna device 200A is mounted on a housing (illustration omitted) like that of a smartphone and is used as a UWB antenna, the antenna device 200A is formed with a thickness of about 0.3 mm, and operates at a resonance frequency of 6 to 10 GHz.

In the case where the antenna device 200A is used as a UWB antenna for mounting on a housing, the antenna device 200A can be fabricated with a flexible printed circuit board (a flexible printed circuit, hereinafter also referred to as an "FPC"). In this case, the antenna device 200A is, for example, formed with a thickness of about 0.2 to 0.3 mm by using a dielectric having a permittivity of 2.9. Thus, in the antenna device 200A formed, a stripline 241*a* that makes matching in agreement with a high frequency band of UWB of 6 GHz to 10 GHz needs to be formed with a line width of about 0.1 mm. Further, each of the striplines 241*b* and 241*c* of 100Ω needs to be formed with a line width of about 0.01 mm.

However, in the current technology, it is difficult to form striplines 241*b* and 241*c* each having a line width of 0.01 mm.

Thus, it is assumed that each of the striplines 241*b* and 241*c* is formed with a line width of 0.1 mm similarly to the stripline 241*a*. Then, the matching loss at the connection point with the striplines 241*b* and 241*c* becomes large, for example, 1 dB.

Figure 7:
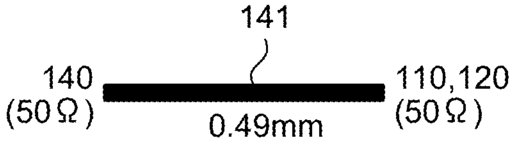
FIG. 7 is a diagram illustrating an example of power supply by a microstripline according to the first modification example of the first embodiment of the present disclosure.

FIG. 7 is a diagram illustrating an example of power supply by the microstripline 141 according to the first modification example of the first embodiment of the present disclosure. As illustrated in FIG. 7, in the antenna device 100A according to the present modification example, power is supplied to both the first and second patch antennas 110 and 120 by one microstripline 141.

Thus, by supplying power to both the first and second patch antennas 110 and 120 by means of one microstripline 141, the antenna device 100A does not need to branch the microstripline 141. That is, in the antenna device 100A, it is sufficient that one microstripline 141 having an impedance of 50Ω be formed.

As described above, in the case where the antenna device 100A is used as a UWB antenna for mounting on a housing, the antenna device 100A can be fabricated with an FPC. In this case, it is assumed that the antenna device 100A is, for example, formed with a thickness of about 0.2 by using a dielectric having a permittivity of 2.9 and that the microstripline 141 is formed to match 50Ω at an operating frequency of 7 GHz. In this case, the line width of the microstripline 141 is about 0.49 mm.

Thus, the antenna device 100A according to the present modification example does not need to branch the microstripline 141, and can reduce the matching loss due to branching. Further, since the antenna device 100A does not need branching of the microstripline 141, the design of the feeding line is easier. Thereby, the antenna device 100A can more easily achieve downsizing and reduction in matching loss while keeping the performance of the antenna.

3. Second Modification Example

Although the first and second patch antennas 110 and 120 are configured as different antenna elements in the first embodiment and the first modification example, the present disclosure is not limited thereto. For example, the first and second patch antennas 110 and 120 may be an integrally formed element. That is, the first and second patch antennas 110 and 120 may be formed using one conductor plate.

Further, although in FIG. 1 the short circuit plate 130 is formed of one conductor plate, the present disclosure is not limited thereto. For example, the short circuit plate 130 may be formed of a plurality of vias. In this case, the short circuit plate 130 has a configuration in which a plurality of vias that connect the first and second patch antennas 110 and 120 and the ground (illustration omitted) are provided along the first side 130*a*.

Figure 8:
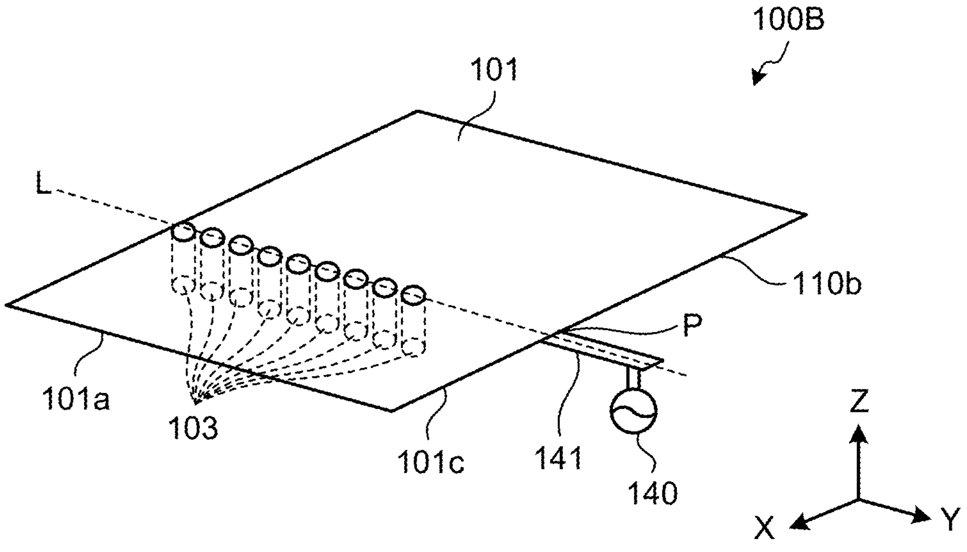
FIG. 8 is a diagram illustrating an example of a schematic configuration of an antenna device according to a second modification example of the first embodiment of the present disclosure.

FIG. 8 is a diagram illustrating an example of a schematic configuration of an antenna device 100B according to a second modification example of the first embodiment of the present disclosure.

In the case where, for example, the first and second patch antennas 110 and 120 are formed of one conductor plate 101, the antenna device 100 includes one conductor plate 101 and a plurality of vias 103 formed in the conductor plate 101 substantially parallel to a first side 101*a* of the conductor plate 101.

The plurality of vias 103 are arranged substantially in a straight line in the direction from a second side 101*b* substantially perpendicular to the first side 101*a* to a third side 101*c* parallel to the second side 101*b*. The plurality of vias 103 are arranged substantially in a straight line from the second side 101*b* not to the third side 101*c* but to a substantially central region of the conductor plate 101 before reaching the third side 101*c*.

The feeding point 140 is connected to the third side 101*c* via a microstripline 141. In the example of FIG. 8, the microstripline 141 is connected to the conductor plate 101 at the intersection point P of a straight line L in which the plurality of vias 103 are aligned and the third side 101*c*.

In FIG. 8, the plurality of vias 103 are arranged nearer to the first side 101*a* with respect to the center of the conductor plate 101. In what positions of the conductor plate 101 the plurality of vias 103 are to be formed is determined according to the size or the resonance frequencies (the first and second resonance frequencies) of the conductor plate 101.

Thus, the antenna device 100B may be configured with one conductor plate 101 and a plurality of vias 103.

4. Second Embodiment

Figure 9:
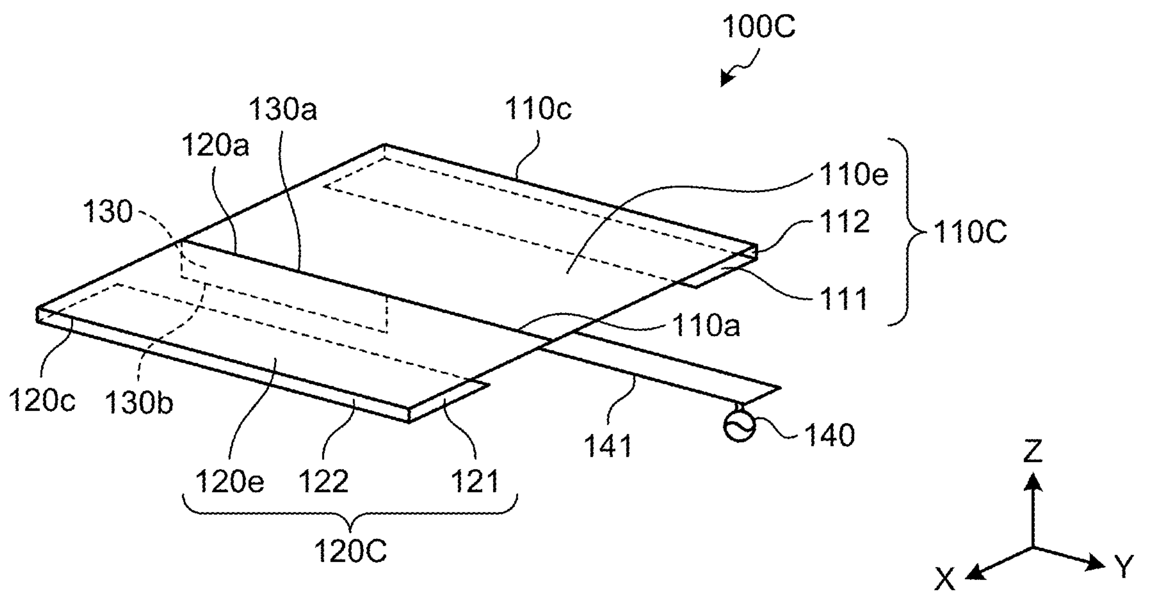
FIG. 9 is a diagram illustrating an example of a schematic configuration of an antenna device according to a second embodiment of the present disclosure.

FIG. 9 is a diagram illustrating an example of a schematic configuration of an antenna device 100C according to a second embodiment of the present disclosure. The antenna device 100C of FIG. 9 is different from the antenna device 100A of FIG. 4 in that end portions of a first and a second patch antennas 110C and 120C are folded back.

As illustrated in FIG. 9, the first patch antenna 110C includes a first conductor plate 110*e*, a second conductor plate 111, and a third conductor plate 112. The first conductor plate 110*e* operates as a main radiation surface of the first patch antenna 110C. The second conductor plate 111 is placed substantially parallel to the first conductor plate 110*e*. The second conductor plate 111 is placed between the ground (illustration omitted) and the first conductor plate 110*e*.

The third conductor plate 112 is placed substantially perpendicular to the first conductor plate 110*e* and the second conductor plate 111. One side of the third conductor plate 112 is connected to a third side 110*c* of the first conductor plate 110*e*, and another side is connected to one side of the second conductor plate 111. The third conductor plate 112 electrically connects the first conductor plate 110*e* and the second conductor plate 111.

Thus, the first patch antenna 110C has a folded portion (folded structure) including the second conductor plate 111 and the third conductor plate 112.

The second patch antenna 120C includes a first conductor plate 120*e*, a second conductor plate 121, and a third conductor plate 122. The first conductor plate 120*e* operates as a main radiation surface of the second patch antenna 120C. The second conductor plate 121 is placed substantially parallel to the first conductor plate 120*e*. The second conductor plate 121 is placed between the ground (illustration omitted) and the first conductor plate 120*e*.

The third conductor plate 122 is placed substantially perpendicular to the first conductor plate 120*e* and the second conductor plate 121. One side of the third conductor plate 122 is connected to a third side 120*c* of the first conductor plate 120*e*, and another side is connected to one side of the second conductor plate 121. The third conductor plate 122 electrically connects the first conductor plate 120*e* and the second conductor plate 121.

Thus, the second patch antenna 120C has a folded portion (folded structure) including the second conductor plate 121 and the third conductor plate 122.

As above, the antenna device 100C according to the second embodiment of the present disclosure has a folded structure on each of the third sides 110*c* and 120*c* (examples of another side) of the first and second patch antennas 110 and 120. Thereby, the antenna device 100C can achieve further downsizing in the area of exclusive use in the XY plane.

5. Third Modification Example

Although in the second embodiment the first and second patch antennas 110 and 120 are configured as different antenna elements, the present disclosure is not limited thereto. For example, the first and second patch antennas 110 and 120 may be an integrally formed element. That is, the first and second patch antennas 110 and 120 may be formed using one conductor plate.

Further, although in the second embodiment the short circuit plate 130 and the third conductor plates 112 and 122 are each formed of one conductor plate, the present disclosure is not limited thereto. For example, the short circuit plate 130 may be formed of a plurality of vias. In this case, the short circuit plate 130 has a configuration in which a plurality of vias that connect the first and second patch antennas 110 and 120 and the ground (illustration omitted) are provided along the first side 130*a*. Further, the third conductor plates 112 and 122 have configurations in which pluralities of vias that connect the first and second patch antennas 110 and 120 and the second conductor plates 111 and 112 are provided along the third sides 110*c* and 120*c*, respectively.

That is, while in the second embodiment an example in which the antenna device 100A illustrated in FIG. 4 has a folded structure is described, the antenna device 100B illustrated in FIG. 8 may have a folded structure.

Figure 10:
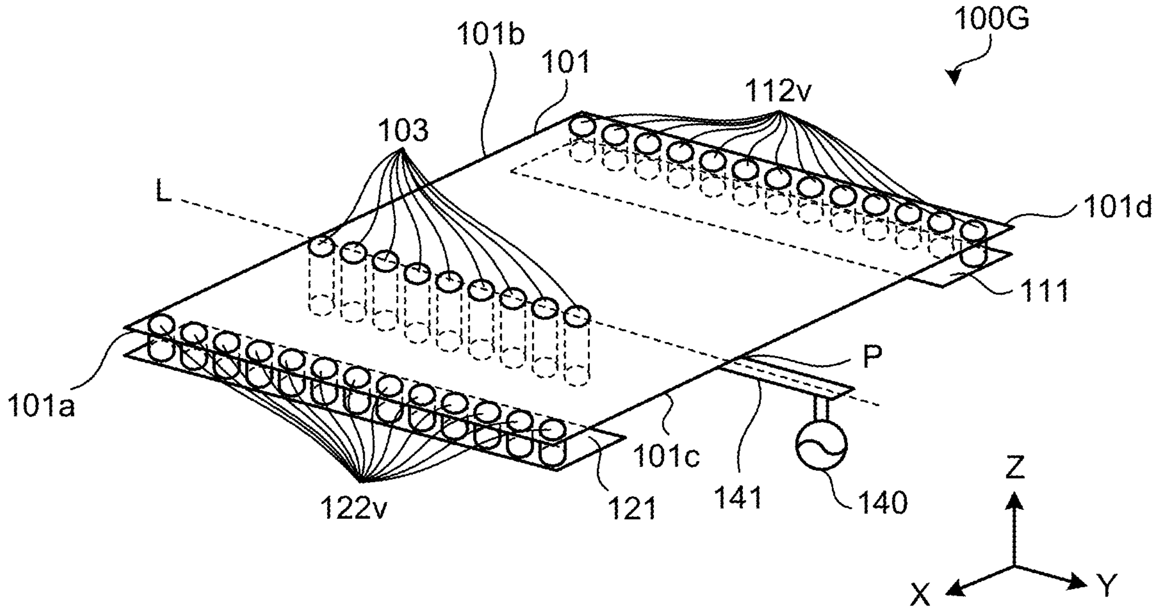
FIG. 10 is a diagram illustrating an example of a schematic configuration of an antenna device according to a third modification example of the second embodiment of the present disclosure.

FIG. 10 is a diagram illustrating an example of a schematic configuration of an antenna device 100G according to a third modification example of the second embodiment of the present disclosure. The antenna device 100G illustrated in FIG. 10 includes, in addition to the configuration of the antenna device 100B illustrated in FIG. 8, a plurality of first vias 112*v*, a plurality of second vias 122*v*, and second conductor plates 111 and 121. The configurations of the second conductor plates 111 and 121 are the same as those of the second conductor plates 111 and 121 of the antenna device 100B illustrated in FIG. 9.

The plurality of first vias 112*v* are arranged substantially in a straight line along a fourth side 101*d* facing the second side 101*a*. The first via 112*v* electrically connects the fourth side 101*d* of the conductor plate 101 and the second conductor plate 111.

The plurality of second vias 122*v* are arranged substantially in a straight line along the second side 101*a*. The second via 122*v* electrically connects the second side 101*a* of the conductor plate 101 and the second conductor plate 121.

Figure 11:
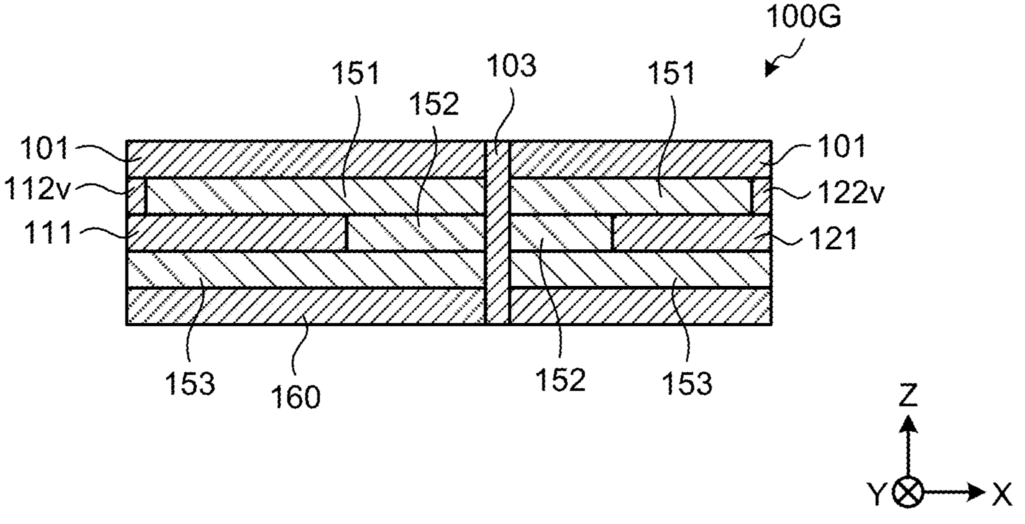
FIG. 11 is a side view of the antenna device according to the third modification example of the second embodiment of the present disclosure.

FIG. 11 is a side view of the antenna device 100G according to the third modification example of the second embodiment of the present disclosure. FIG. 11 illustrates a case where the antenna device 100G is configured with an FPC. FIG. 11 illustrates a side view of the antenna device 100G of FIG. 10 as viewed from the negative side of the Y axis.

As illustrated in FIG. 11, the FPC is formed of five layers. The first conductor plate 101 is formed. In the third layer, the second conductor plates 111 and 121 and a dielectric layer 152 are formed.

In the second layer, the first via 112*v*, the second via 122*v*, and a dielectric layer 151 are formed. The antenna device 100G has a plurality of first vias 112*v* that penetrate the second layer and electrically connect the first conductor plate 101 and the second conductor plate 111. The antenna device 100G has a plurality of second vias 122*v* that penetrate the second layer and electrically connect the first conductor plate 101 and the second conductor plate 121.

In the fourth layer, a dielectric layer 153 is formed. In the fifth layer, a conductor plate 160 functioning as the ground is formed.

The antenna device 100G has a plurality of vias 103 that electrically connect the first conductor plate 101 and the conductor plate 160. The antenna device 100G has a plurality of vias 103 that electrically connect the first conductor plate 101 and the conductor plate 160.

Although illustration is omitted in FIG. 11, a microstripline 141 that supplies power to the first conductor plate 101 is formed in the first layer.

The permittivities of the dielectric layers 151 to 153 formed in the second to fourth layers may be the same or different from each other. The dielectric layer may play a role as adhesive paper.

Thus, the antenna device 100G can be produced as an FPC. By thus using an FPC to create a folded structure, for example, the first conductor plate 101 and each of the second conductor plates 111 and 121 can be arranged with a gap of, for example, about 0.1 mm. Thus, by using an FPC and vias to configure an antenna device 100G, a thin antenna device of about 0.3 mm can be produced.

6. Third Embodiment

Figure 12:
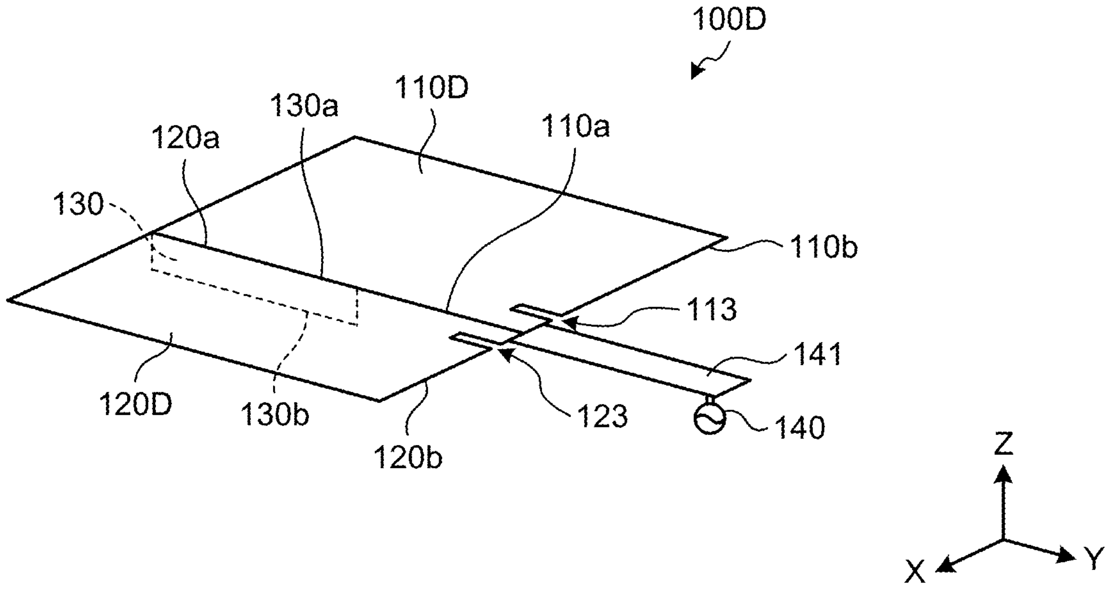
FIG. 12 is a diagram illustrating an example of a schematic configuration of an antenna device according to a third embodiment of the present disclosure.

FIG. 12 is a diagram illustrating an example of a schematic configuration of an antenna device 100D according to a third embodiment of the present disclosure. The antenna device 100D of FIG. 12 is different from the antenna device 100A of FIG. 4 in that each of the second sides 110*b* and 120*b* of a first and a second patch antenna 110D and 120D has a notch (slit).

As illustrated in FIG. 12, the second side 110*b* of the first patch antenna 110D has a notch 113 in the vicinity of the joining portion with the microstripline 141. Further, the second side 120*b* of the second patch antenna 120D has a notch 123 in the vicinity of the joining portion with the microstripline 141.

Thus, the antenna device 100D performs inset power supply by providing the notches 113 and 123 in the joining portions between the microstripline 141 and the first and second patch antennas 110D and 120D. Thereby, the antenna device 100D can more easily make matching with each of the first resonance frequency and the second resonance frequency.

Although herein the antenna device 100D has notches 113 and 123 on both the second sides 110*b* and 120*b* of the first and second patch antennas 110D and 120D, the present disclosure is not limited thereto. The antenna device 100D may have a notch 113 (or a notch 123) on at least one of the second sides 110*b* and 120*b*.

7. Fourth Embodiment

Figure 13:
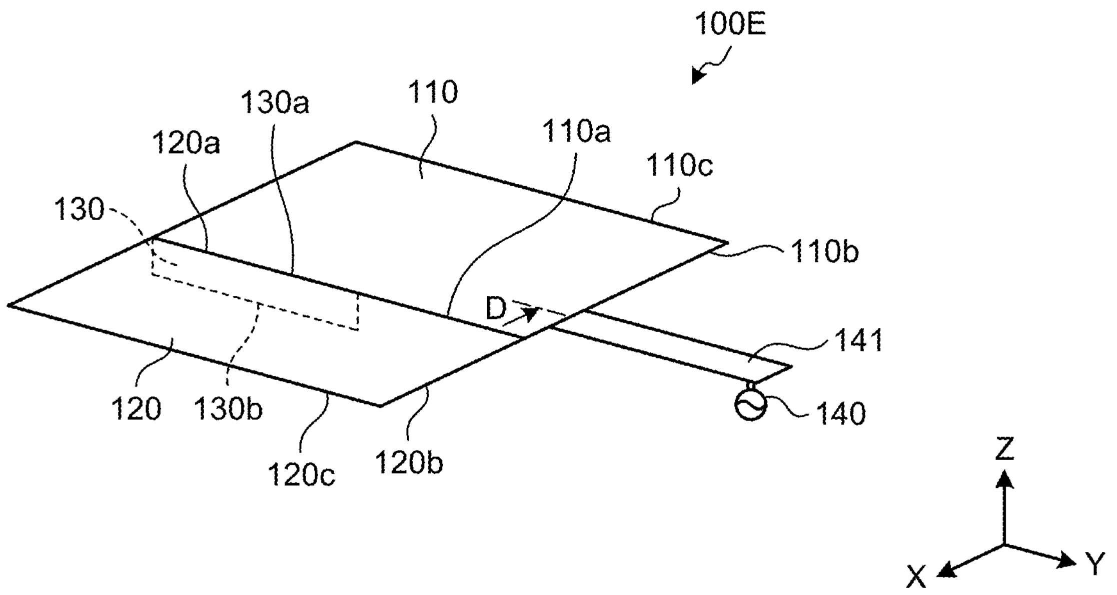
FIG. 13 is a diagram illustrating an example of a schematic configuration of an antenna device according to a fourth embodiment of the present disclosure.

FIG. 13 is a diagram illustrating an example of a schematic configuration of an antenna device 100E according to a fourth embodiment of the present disclosure. The antenna device 100E of FIG. 13 is different from the antenna device 100A of FIG. 4 in the joining position between the microstripline 141 and the first and second patch antennas 110 and 120.

The microstripline 141 of the antenna device 100E illustrated in FIG. 13 is placed such that one end of the microstripline 141 is connected to the second side 110*b* of the first patch antenna 110. Thus, the microstripline 141 of the fourth embodiment is connected to the second side 110*b* with a shift of distance D from the first side 110*a* of the first patch antenna 110 toward the third side 110*c*.

In the antenna device 100A illustrated in FIG. 4, the microstripline 141 is placed on an extension line in the longitudinal direction of the short circuit plate 130. On the other hand, in the antenna device 100E illustrated in FIG. 13, the microstripline 141 is placed with a shift (parallel translation) of distance D in a direction substantially perpendicular to the longitudinal direction of the short circuit plate 130.

Thus, by supplying power to the first and second patch antennas 110 and 120 with a shift from end portions of the first and second patch antennas 110 and 120, the antenna device 100E can adjust radiation efficiency between the first and second resonance frequencies.

Although in FIG. 13 the microstripline 141 is connected to the second side 110*b* of the first patch antenna 110, the present disclosure is not limited thereto. The microstripline 141 may be connected to the second side 120*b* of the second patch antenna 120. That is, the microstripline 141 may be connected to a position of the second side 120*b* of the second patch antenna 120 away from the first side 120*a* toward the third side 120*c* by distance D.

Thus, the feeder (the microstripline 141) that supplies power to the first and second patch antennas 110 and 120 can be placed with a shift toward either of the first patch antenna 110 and the second patch antenna 120.

8. Fifth Embodiment

Figure 14:
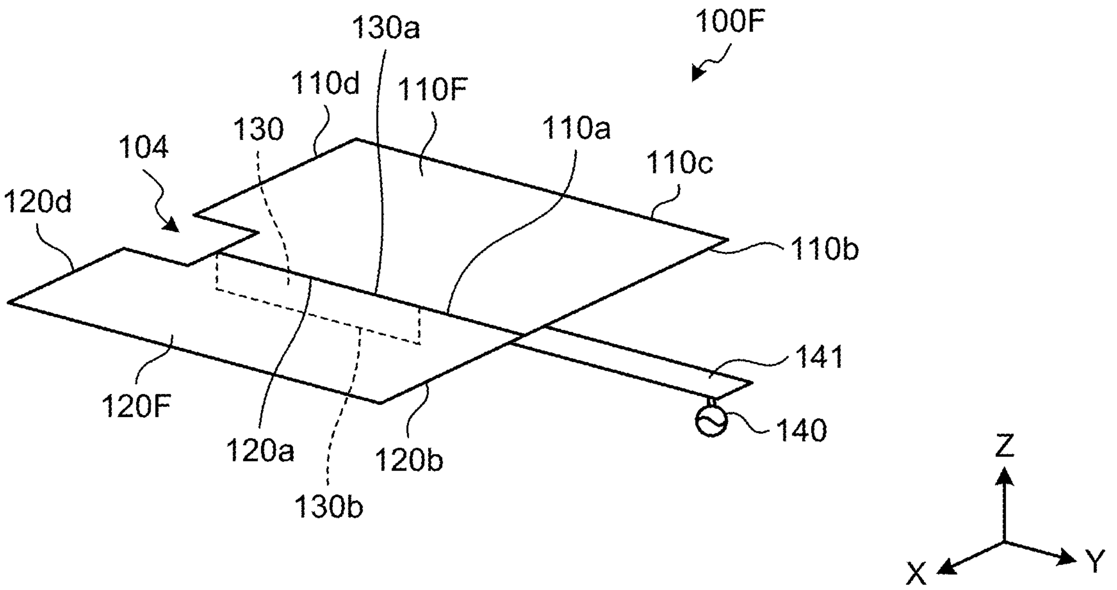
FIG. 14 is a diagram illustrating an example of a schematic configuration of an antenna device according to a fifth embodiment of the present disclosure.

FIG. 14 is a diagram illustrating an example of a schematic configuration of an antenna device 100F according to a fifth embodiment of the present disclosure. The antenna device 100F of FIG. 14 is different from the antenna device 100A of FIG. 4 in that a slit (notch) 104 is provided on fourth sides 110*d* and 120*d* of a first and a second patch antenna 110F and 120F.

As illustrated in FIG. 14, the antenna device 100F has a slit 104 on the fourth sides 110*d* and 120*d* of the first and second patch antennas 110F and 120F. Accordingly, the short circuit plate 130 is placed with a shift toward the microstripline 141 with respect to that of the antenna device 100A illustrated in FIG. 4.

In the antenna device 100F of the fifth embodiment, the short circuit plate 130 is shifted toward the second sides 110*b* and 120*b* of the first and second patch antennas 110F and 120F. Thereby, portions of the first sides 110*a* and 120*a* not short-circuited by the short circuit plate 130 are generated on the sides of the fourth sides 110*d* and 120*d*. A slit 104 that notches the first sides 110*a* and 120*a* is formed in the generated portions.

Thus, by providing the slit 104, the length in the resonance length direction (the X-axis direction) of the antenna device 100F can be reduced. Therefore, the antenna device 100F according to the fifth embodiment can achieve further downsizing.

9. Sixth Embodiment

Figure 15:
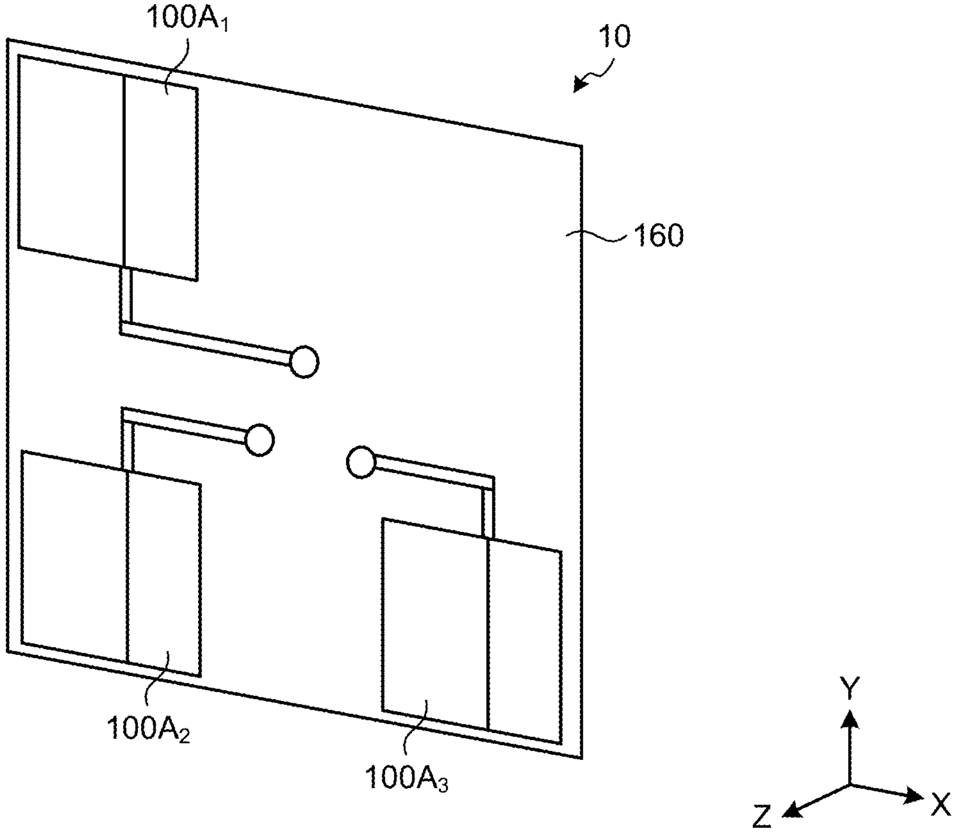
FIG. 15 is a diagram illustrating an example of a schematic configuration of an antenna module according to a sixth embodiment of the present disclosure.

FIG. 15 is a diagram illustrating an example of a schematic configuration of an antenna module 10 according to a sixth embodiment of the present disclosure. The antenna module 10 illustrated in FIG. 15 includes a ground 160 and a first to a third antenna device 100$A_1$ to 100$A_3$.

In the example illustrated in FIG. 15, the first to third antenna devices 100$A_1$ to 100$A_3$ are arranged in a substantially L-shaped configuration. That is, the first and second antenna devices 100$A_1$ and 100$A_2$ are arranged side by side in the Y-axis direction, and the second and third antenna devices 100$A_2$ and 100$A_3$ are arranged side by side in the X-axis direction.

In the example illustrated in FIG. 15, the first to third antenna devices 100$A_1$ to 100$A_3$ are arranged such that the polarization directions thereof are the same. That is, the first to third antenna devices 100$A_1$ to 100$A_3$ are arranged such that the longitudinal directions of the short circuit plates thereof run along the same direction (the Y-axis direction).

As described above, in the antenna module 10, the first and second antenna devices 100$A_1$ and 100$A_2$ are arranged side by side in the Y-axis direction. Therefore, a detection device (illustration omitted) connected to the antenna module 10 can detect the elevation angle (elevation direction) of a reception signal by using the phase difference between signals received by the first and second antenna devices 100$A_1$ and 100$A_2$.

Further, in the antenna module 10, the second and third antenna devices 100$A_2$ and 100$A_3$ are arranged side by side in the X-axis direction. Therefore, a detection device (illustration omitted) connected to the antenna module 10 can detect the azimuth angle (azimuth direction) of a reception signal by using the phase difference between signals received by the second and third antenna devices 100$A_2$ and 100$A_3$.

The above-described detection device (illustration omitted) estimates the elevation angle and the azimuth angle of a reception signal described above by using the first to third antenna devices 100$A_1$ to 100$A_3$. Further, the detection device (illustration omitted) performs distance measurement of a reception signal (that is, detection of the distance to a transmission device that has transmitted a reception signal) by using any one of the first to third antenna devices 100$A_1$ to 100$A_3$. Thus, the detection device (illustration omitted) enables distance measurement and position measurement of a reception signal by using the antenna module 10.

Figure 16:
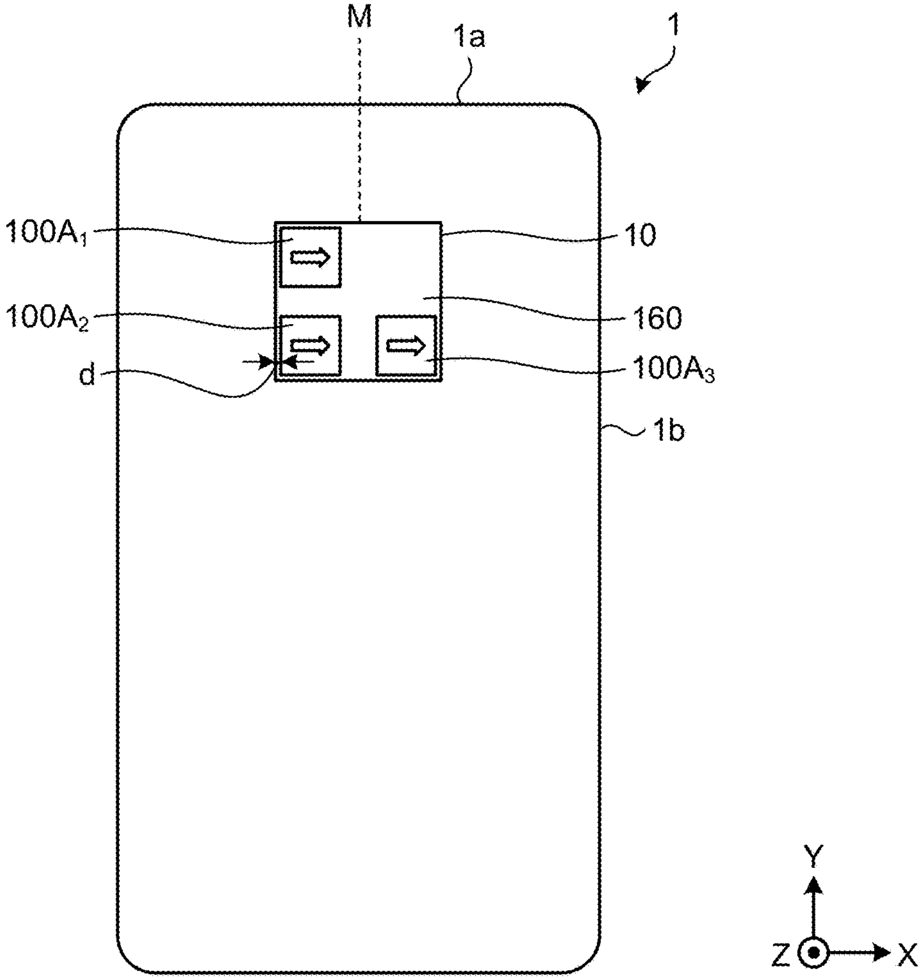
FIG. 16 is a diagram illustrating an arrangement example of the antenna module according to the sixth embodiment of the present disclosure.

FIG. 16 is a diagram illustrating an arrangement example of the antenna module 10 according to the sixth embodiment of the present disclosure. FIG. 16 illustrates a case where the antenna module 10 is mounted on, for example, a terminal device 1 such as a smartphone. That is, FIG. 16 illustrates a case where the antenna module 10 is mounted on a substantially rectangular housing.

As illustrated in FIG. 16, in the case where the antenna module 10 is mounted on the housing of the terminal device 1, the antenna module 10 is placed such that the polarization directions of the first to third antenna devices 100$A_1$ to 100$A_3$ are substantially parallel to a short side 1*a* of the housing of the terminal device 1.

Further, the antenna module 10 is placed in the housing of the terminal device 1 to be located substantially at the center M in the short direction of the housing of the terminal device 1. Thereby, the housing of the terminal device 1 can be regarded as the ground of the antenna module 10. Thus, the ground 160 of the antenna module 10 can be made small.

In general, a patch antenna is provided with a ground larger than the antenna element in order to obtain an end effect. However, the size of the ground has been a factor in size increase of the antenna device (or the antenna module).

Thus, in the sixth embodiment of the present disclosure, the antenna module 10 is placed substantially at the center M in the short direction of the terminal device 1, and thereby the terminal device 1 can be regarded as the ground of the antenna module 10 as described above. Thereby, even when the ground 160 of the antenna module 10 is small, the first to third antenna devices 100$A_1$ to 100$A_3$ can obtain a sufficient end effect, and the antenna module 10 can obtain sufficient radiation efficiency while achieving downsizing.

For example, it is assumed that, as viewed from the Z-axis direction, the distance d between an end portion of the ground 160 and each of end portions of the first to third antenna devices 100$A_1$ to 100$A_3$ is 1 mm or less. Even in this case, the antenna module 10 can obtain sufficient radiation efficiency by placing the antenna module 10 substantially at the center in the polarization direction of the terminal device 1.

Although herein an example in which the antenna module 10 includes the antenna device 100A according to the first modification example of the first embodiment is described, the antenna device included in the antenna module 10 is not limited thereto. The antenna module 10 can include any of the antenna devices of the embodiments and the modification examples.

Further, although herein a case where the antenna module 10 includes three antenna devices 100A is described, the present disclosure is not limited thereto. The number of antenna devices 100A included in the antenna module 10 may be two or less, or four or more.

Further, the arrangement of the first to third antenna devices 100$A_1$ to 100$A_3$ is not limited to the example of FIG. 15. The first to third antenna devices 100$A_1$ to 100$A_3$ may, for example, be arranged in a row.

10. Seventh Embodiment

Figure 17:
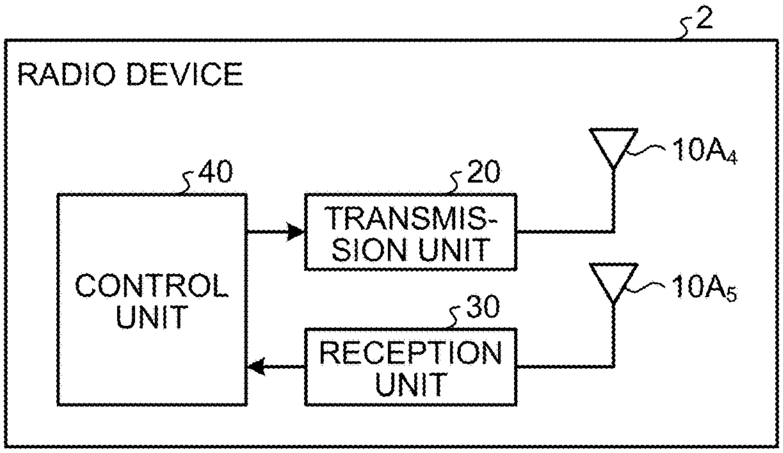
FIG. 17 is a block diagram illustrating an example of a schematic configuration of a radio device according to a seventh embodiment of the present disclosure.

FIG. 17 is a block diagram illustrating an example of a schematic configuration of a radio device 2 according to a seventh embodiment of the present disclosure.

The radio device 2 illustrated in FIG. 17 includes a transmission-side antenna device 100$A_4$, a reception-side antenna device 100$A_5$, a transmission unit 20, a reception unit 30, and a control unit 40.

The transmission-side antenna device 100$A_4$ has, for example, the same configuration as the antenna device 100A illustrated in FIG. 4. The transmission-side antenna device 100$A_4$ transmits, to a communication partner (illustration omitted), a transmission signal generated by the transmission unit 20.

The reception-side antenna device 100$A_5$ has, for example, the same configuration as the antenna device 100A illustrated in FIG. 4. The reception-side antenna device 100$A_5$ outputs, to the reception unit 30, a reception signal received from a communication partner.

The transmission unit 20 generates a transmission signal in accordance with an instruction from the control unit 40, and outputs the transmission signal to the transmission-side antenna device 100$A_4$. The reception unit 30 decodes a reception signal in accordance with an instruction from the control unit 40. The control unit 40 controls the transmission unit 20 and the reception unit 30 to perform communication with a communication partner.

Thus, the radio device 2 according to the present embodiment includes the antenna device 100A and a radio unit (the transmission unit 20 and/or the reception unit 30). By virtue of the fact that the radio device 2 includes the antenna device 100A, which can achieve downsizing, the radio device 2 can be further downsized.

Although herein the radio device 2 includes antenna devices 100A as both a transmission-side antenna and a reception-side antenna, the present disclosure is not limited thereto. The radio device 2 may include an antenna device 100A as at least one of a transmission-side antenna and a reception-side antenna. Further, the radio device 2 may perform one of transmission and reception instead of both transmission and reception.

Although herein an example in which the radio device 2 includes the antenna device 100A according to the first modification example of the first embodiment is described, the antenna device included in the radio device 2 is not limited thereto. The radio device 2 can include any of the antenna devices of the embodiments and the modification examples.

Although herein the radio device 2 performs communication with a communication partner, the present disclosure is not limited thereto. For example, the radio device 2 may perform at least one of distance measurement and angle measurement for a radio device as a measurement target (illustration omitted). Here, in the case where the radio device 2 performs distance measurement and/or angle measurement on the basis of a transmission signal transmitted by a radio device as a measurement target, the transmission unit 20 of the radio device 2 can be omitted. Alternatively, in the case where a signal is transmitted to a measurement device (illustration omitted) that performs distance measurement and/or angle measurement of the radio device 2, the reception unit 30 of the radio device 2 can be omitted.

11. Summary

Hereinabove, embodiments of the present disclosure are described; however, the technical scope of the present disclosure is not limited to the embodiments described above as they are, and various alterations can be made without departing from the gist of the present disclosure. Further, components of different embodiments and modification examples may be combined as appropriate.

The effects in the embodiments described in the present specification are merely examples and are not limitative ones, and there may be other effects.

The present technology can also take the following configurations.

(1)

An antenna device comprising:

a first patch antenna;

a second patch antenna having a resonance frequency different from a resonance frequency of the first patch antenna; and a short circuit plate that short-circuits one side of the first patch antenna and one side of the second patch antenna to a ground, wherein a length of one side of the short circuit plate, the one side of the short circuit plate being connected to the one side of the first patch antenna and the one side of the second patch antenna, is shorter than a length of each of the one side of the first patch antenna and the one side of the second patch antenna.

(2)

The antenna device according to (1), wherein the first patch antenna and the second patch antenna are supplied with power by one feeder.

(3)

The antenna device according to (2), wherein one end of the feeder is connected to one end of the one side of the first patch antenna and one end of the one side of the second patch antenna.

(4)

The antenna device according to (2) or (3), wherein one end of the feeder is connected to a position of a side of one of the first patch antenna and the second patch antenna, the position being away by a predetermined distance from one ends of the one sides of the first patch antenna and the second patch antenna.

(5)

The antenna device according to any one of (2) to (4), having a notch on at least one of a side connected to the feeder of the first patch antenna and a side connected to the feeder of the second patch antenna.

(6)

The antenna device according to any one of (1) to (5), wherein the short circuit plate is formed of a plurality of vias.

(7)

The antenna device according to any one of (1) to (6), wherein the one side of the first patch antenna and the one side of the second patch antenna are connected to each other.

(8)

The antenna device according to any one of (1) to (7), wherein the first patch antenna and the second patch antenna are formed using one conductor plate.

(9)

The antenna device according to any one of (1) to (8), wherein at least one of the first patch antenna and the second patch antenna has a folded structure on another side facing the one side.

(10)

The antenna device according to (9), wherein the folded structure includes:

a conductor plate substantially parallel to at least one of the first patch antenna and the second patch antenna; and a plurality of vias that connect one side of the conductor plate and the other side of at least one of the first patch antenna and the second patch antenna.

(11)

The antenna device according to any one of (1) to (10), having a notch on a side of at least one of the first patch antenna and the second patch antenna, the side being connected to one end of the short circuit plate.

(12)

An antenna module comprising a ground and an antenna device, the antenna device including:

a first patch antenna;

a second patch antenna having a resonance frequency different from a resonance frequency of the first patch antenna; and a short circuit plate that short-circuits one side of the first patch antenna and one side of the second patch antenna to the ground, wherein a length of one side of the short circuit plate, the one side of the short circuit plate being connected to the one side of the first patch antenna and the one side of the second patch antenna, is shorter than a length of each of the one side of the first patch antenna and the one side of the second patch antenna.

(13)

The antenna module according to (12), wherein the antenna device includes three antenna devices, and the three antenna devices are arranged in an L-shaped configuration on a surface of the ground.

(14)

The antenna module according to (12) or (13), wherein the antenna module is mounted on a substantially rectangular housing, and the ground is placed to be located substantially at a center in a short direction of the housing.

(15)

A radio device comprising:

an antenna device; and a radio unit that performs transmission or reception of a signal via the antenna device, wherein the antenna device includes:

a first patch antenna;

a second patch antenna having a resonance frequency different from a resonance frequency of the first patch antenna; and a short circuit plate that short-circuits one side of the first patch antenna and one side of the second patch antenna to a ground, and a length of one side of the short circuit plate, the one side of the short circuit plate being connected to the one side of the first patch antenna and the one side of the second patch antenna, is shorter than a length of each of the one side of the first patch antenna and the one side of the second patch antenna.

REFERENCE SIGNS LIST

1 TERMINAL DEVICE
2 RADIO DEVICE
10 ANTENNA MODULE
20 TRANSMISSION UNIT
30 RECEPTION UNIT
40 CONTROL UNIT
100, 100A, 100B, 100C, 100D, 100E, 100F ANTENNA DEVICE
101 CONDUCTOR PLATE
103 VIA
104 SLIT
110, 110C, 110D FIRST PATCH ANTENNA
120, 120C, 120D SECOND PATCH ANTENNA
110*e*, 120*e* FIRST CONDUCTOR PLATE
111, 121 SECOND CONDUCTOR PLATE
112, 122 THIRD CONDUCTOR PLATE
130 SHORT CIRCUIT PLATE
140 FEEDING POINT
141, 141*a*, 141*b* MICROSTRIPLINE
151, 152, 153 DIELECTRIC LAYER
160 GROUND

The invention claimed is:

1. An antenna device comprising:

a first patch antenna;

a second patch antenna having a resonance frequency different from a resonance frequency of the first patch antenna; and a short circuit plate that short-circuits one side of the first patch antenna and one side of the second patch antenna to a ground, wherein a length of one side of the short circuit plate, the one side of the short circuit plate being connected to the one side of the first patch antenna and the one side of the second patch antenna, is shorter than a length of each of the one side of the first patch antenna and the one side of the second patch antenna, the first patch antenna has a folded structure on another side facing the one side of the first patch antenna short-circuited to the ground via the short circuit plate, the second patch antenna has a folded structure on another side facing the one side of the second patch antenna short-circuited to the ground via the short circuit plate, the folded structure of the first patch antenna includes a first conductor plate that is substantially parallel to a main radiation surface of the first patch antenna, the folded structure of the second patch antenna includes a second conductor plate that is substantially parallel to a main radiation surface of the second patch antenna, the first conductor plate extends under the main radiation surface of the first patch antenna in a direction towards the short circuit plate, the second conductor plate extends under the main radiation surface of the second patch antenna in the direction towards the short circuit plate, a length of the first conductor plate in the direction towards the short circuit plate is shorter than a length from the other side to the one side of the first patch antenna, and a length of the second conductor plate in the direction towards the short circuit plate is shorter than a length from the other side to the one side of the second patch antenna.

2. The antenna device according to claim 1, wherein the first patch antenna and the second patch antenna are supplied with power by one feeder.

3. The antenna device according to claim 2, wherein one end of the feeder is connected to one end of the one side of the first patch antenna and one end of the one side of the second patch antenna.

4. The antenna device according to claim 2, wherein one end of the feeder is connected to a position of a side of one of the first patch antenna and the second patch antenna, the position being away by a predetermined distance from one end of the one sides of the first patch antenna and the second patch antenna.

5. The antenna device according to claim 2, further comprising a notch on at least one of a side connected to the feeder of the first patch antenna or a side connected to the feeder of the second patch antenna.

6. The antenna device according to claim 1, wherein the short circuit plate is formed of a plurality of vias.

7. The antenna device according to claim 1, wherein the one side of the first patch antenna and the one side of the second patch antenna are connected to each other.

8. The antenna device according to claim 1, wherein the first patch antenna and the second patch antenna are formed using one conductor plate.

9. The antenna device according to claim 1, having a notch on a side of at least one of the first patch antenna or the second patch antenna, the side being connected to one end of the short circuit plate.

10. The antenna device according to claim 9, wherein the notch is provided on both a resonance side of the first patch antenna and a resonance side of the second patch antenna.

11. The antenna device according to claim 1, wherein at least one of:

the first conductor plate and the main radiation surface of the first patch antenna are separated by a gap of approximately 0.1 mm, or the second conductor plate and the main radiation surface of the second patch antenna are separated by a gap of approximately 0.1 mm.

12. The antenna device according to claim 1, wherein the antenna device is formed of a flexible printed circuit including at least five conductive layers.

13. The antenna device according to claim 2, wherein the one feeder comprises a microstripline having a line width of approximately 0.49 mm.

14. The antenna device according to claim 1, wherein at least one of:

the first conductor plate is electrically connected to the main radiation surface of the first patch antenna on the other side of the first patch antenna by a first plurality of vias arranged in a straight line along an edge of the other side of the first patch antenna, or the second conductor plate is electrically connected to the main radiation surface of the of the second patch antenna on the other side of the second patch antenna by a second plurality of vias arranged in a straight line along an edge of the other side of the second patch antenna.

15. An antenna module comprising:

a ground; and an antenna device, the antenna device including:

a first patch antenna;

a second patch antenna having a resonance frequency different from a resonance frequency of the first patch antenna; and a short circuit plate that short-circuits one side of the first patch antenna and one side of the second patch antenna to the ground, wherein a length of one side of the short circuit plate, the one side of the short circuit plate being connected to the one side of the first patch antenna and the one side of the second patch antenna, is shorter than a length of each of the one side of the first patch antenna and the one side of the second patch antenna, the first patch antenna has a folded structure on another side facing the one side of the first patch antenna short-circuited to the ground via the short circuit plate, the second patch antenna has a folded structure on another side facing the one side of the second patch antenna short-circuited to the ground via the short circuit plate, the folded structure of the first patch antenna includes a first conductor plate that is substantially parallel to a main radiation surface of the first patch antenna, the folded structure of the second patch antenna includes a second conductor plate that is substantially parallel to a main radiation surface of the second patch antenna, the first conductor plate extends under the main radiation surface of the first patch antenna in a direction towards the short circuit plate, the second conductor plate extends under the main radiation surface of the second patch antenna in the direction towards the short circuit plate, a length of the first conductor plate in the direction towards the short circuit plate is shorter than a length from the other side to the one side of the first patch antenna, and a length of the second conductor plate in the direction towards the short circuit plate is shorter than a length from the other side to the one side of the second patch antenna.

16. The antenna module according to claim 15, wherein the antenna device includes three antenna devices, and the three antenna devices are arranged in an L-shaped configuration on a surface of the ground.

17. The antenna module according to claim 15, wherein the antenna module is mounted on a substantially rectangular housing, and the ground is placed to be located substantially at a center in a short direction of the housing.

18. The antenna module according to claim 16, wherein each of the three antenna devices is placed such that a distance between an end portion of the ground and an end portion of the antenna device is 1 mm or less as viewed from a thickness direction of the antenna module.

19. A radio device comprising:

an antenna device; and a radio unit that performs transmission or reception of a signal via the antenna device, wherein the antenna device includes:

a first patch antenna;

a second patch antenna having a resonance frequency different from a resonance frequency of the first patch antenna; and a short circuit plate that short-circuits one side of the first patch antenna and one side of the second patch antenna to a ground, a length of one side of the short circuit plate, the one side of the short circuit plate being connected to the one side of the first patch antenna and the one side of the second patch antenna, is shorter than a length of each of the one side of the first patch antenna and the one side of the second patch antenna, the first patch antenna has a folded structure on another side facing the one side of the first patch antenna short-circuited to the ground via the short circuit plate, the second patch antenna has a folded structure on another side facing the one side of the second patch antenna short-circuited to the ground via the short circuit plate, the folded structure of the first patch antenna includes a first conductor plate that is substantially parallel to a main radiation surface of the first patch antenna, the folded structure of the second patch antenna includes a second conductor plate that is substantially parallel to a main radiation surface of the second patch antenna, the first conductor plate extends under the main radiation surface of the first patch antenna in a direction towards the short circuit plate, the second conductor plate extends under the main radiation surface of the second patch antenna in the direction towards the short circuit plate, a length of the first conductor plate in the direction towards the short circuit plate is shorter than a length from the other side to the one side of the first patch antenna, and a length of the second conductor plate in the direction towards the short circuit plate is shorter than a length from the other side to the one side of the second patch antenna.

20. The radio device according to claim 19, wherein the radio unit is configured to detect an elevation angle and an azimuth angle of a reception signal based on a phase difference between signals received by the first patch antenna and the second patch antenna.

* * * * *